(12) United States Patent
Landrum et al.

(10) Patent No.: US 8,529,174 B1
(45) Date of Patent: Sep. 10, 2013

(54) LARGE TOWER RAILROAD TRANSPORTATION SYSTEM AND METHOD

(75) Inventors: Scott C. Landrum, Southlake, TX (US); Eric B. Thompson, North Richland Hills, TX (US)

(73) Assignee: Transportation Technology Services, Inc., Southlake, TX (US)

( * ) Notice: Subject to any disclaimer, the term of this patent is extended or adjusted under 35 U.S.C. 154(b) by 178 days.

(21) Appl. No.: 13/079,892

(22) Filed: Apr. 5, 2011

Related U.S. Application Data

(63) Continuation-in-part of application No. 12/539,008, filed on Aug. 11, 2009, now Pat. No. 8,142,120.

(51) Int. Cl.
*B61D 3/16* (2006.01)
*B60P 3/40* (2006.01)

(52) U.S. Cl.
USPC .......................................................... 410/44

(58) Field of Classification Search
USPC ................ 410/49, 53, 82, 2, 36, 44–47, 101; 280/404, 400
See application file for complete search history.

(56) References Cited

U.S. PATENT DOCUMENTS

| | | | |
|---|---|---|---|
| 3,071,269 A * | 1/1963 | Moulds, Jr. .................. | 414/608 |
| 3,648,622 A | 3/1972 | Lich | |
| 3,837,295 A | 9/1974 | Fedele | |
| 4,150,628 A | 4/1979 | Keldenich | |
| 4,341,494 A | 7/1982 | Fedele | |
| 4,365,919 A | 12/1982 | Mehki | |
| 4,844,672 A | 7/1989 | Yurgevich | |
| 5,114,288 A | 5/1992 | Langendorf et al. | |
| 5,579,698 A * | 12/1996 | Lis et al. ...................... | 105/364 |
| 5,802,981 A * | 9/1998 | Kassab ........................ | 105/176 |
| 6,286,435 B1 | 9/2001 | Kassab et al. | |
| 6,398,047 B1 * | 6/2002 | Ladendorf et al. .......... | 213/62 R |
| 6,422,795 B2 | 7/2002 | Holt et al. | |
| 6,827,024 B2 | 12/2004 | Kassab et al. | |
| 7,210,882 B2 | 5/2007 | Anderson et al. | |
| 7,303,365 B2 | 12/2007 | Wobben | |
| 7,429,156 B2 | 9/2008 | Jensen | |
| 7,591,621 B1 * | 9/2009 | Landrum et al. ................ | 410/45 |
| 2004/0091346 A1 | 5/2004 | Wobben | |
| 2005/0031431 A1 | 2/2005 | Wobben | |
| 2005/0063795 A1 | 3/2005 | Jagos et al. | |
| 2006/0285937 A1 | 12/2006 | Wobben | |
| 2007/0051270 A1 * | 3/2007 | Forbes et al. ............. | 105/224.05 |
| 2007/0189895 A1 | 8/2007 | Kootstra et al. | |
| 2007/0248431 A1 | 10/2007 | Jensen | |
| 2009/0169323 A1 | 7/2009 | Livingston | |

* cited by examiner

*Primary Examiner* — Glenn Dayoan
*Assistant Examiner* — Sunsurraye Westbrook
(74) *Attorney, Agent, or Firm* — Dan Brown Law Office; Daniel R. Brown

(57) ABSTRACT

A system for transporting a tower on deck of a railcar includes a locating assembly, with a key assembly fixed to the deck and disengageably coupled to a foot-stop assembly fixed to the tower adjacent to a first end, for locating the tower above the deck, and a saddle assembly and a saddle spacer disposed between the saddle assembly and the tower, where the saddles spacer conforms to the shaped of the elongated portion of the tower, and supports the tower above the deck.

18 Claims, 16 Drawing Sheets

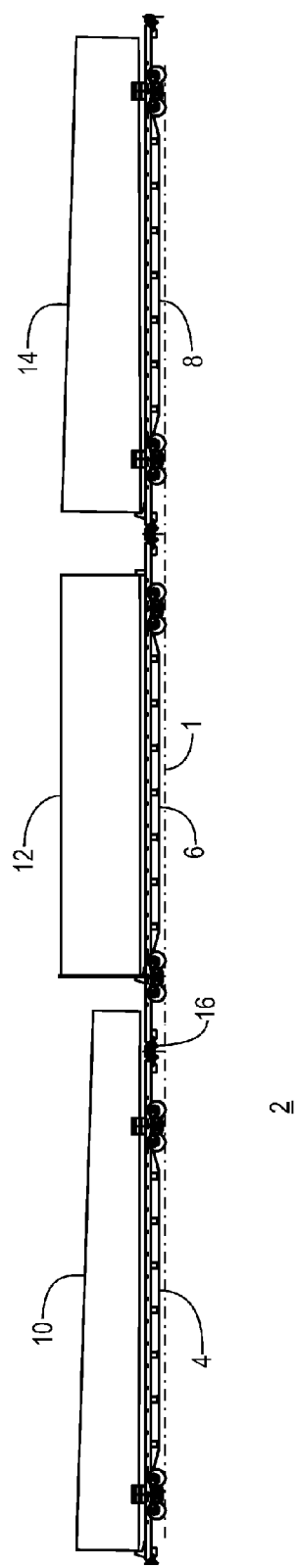

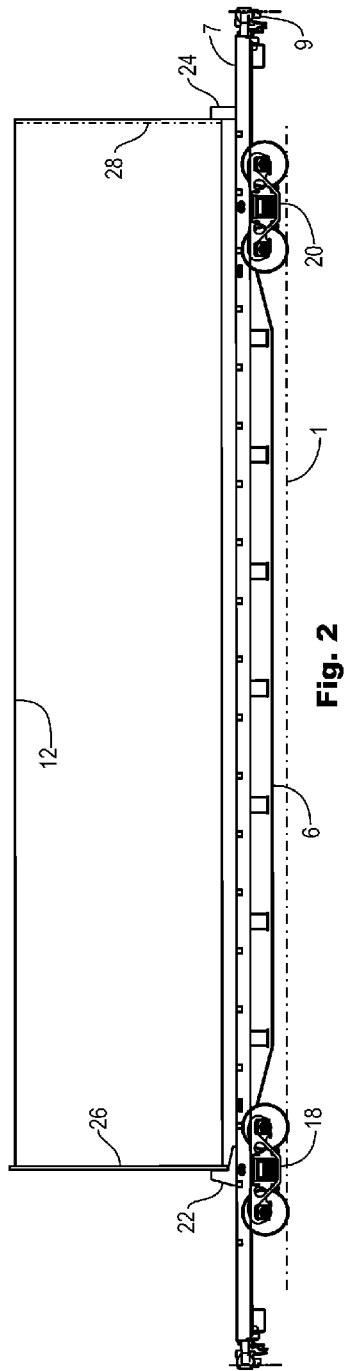
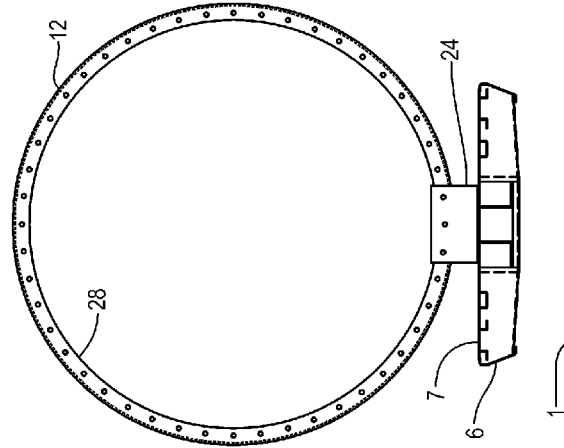
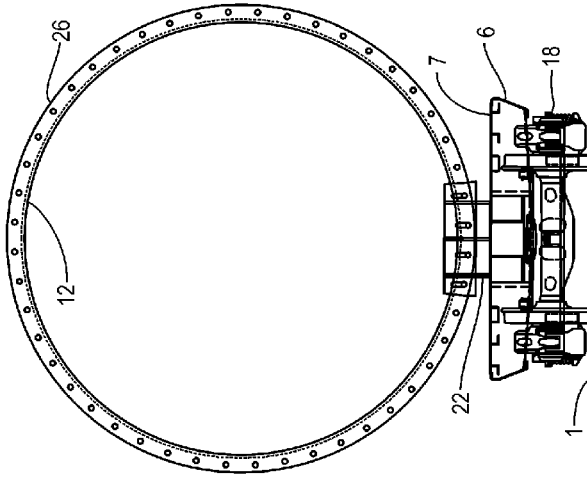

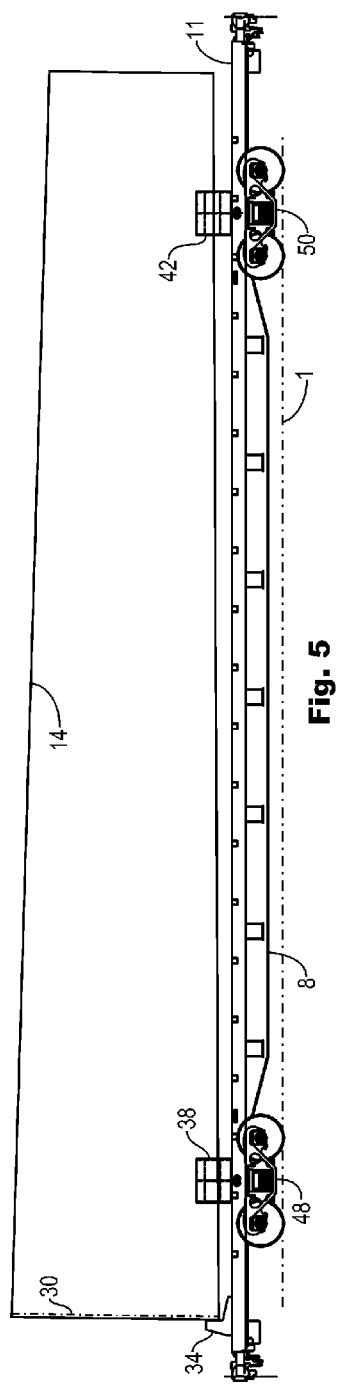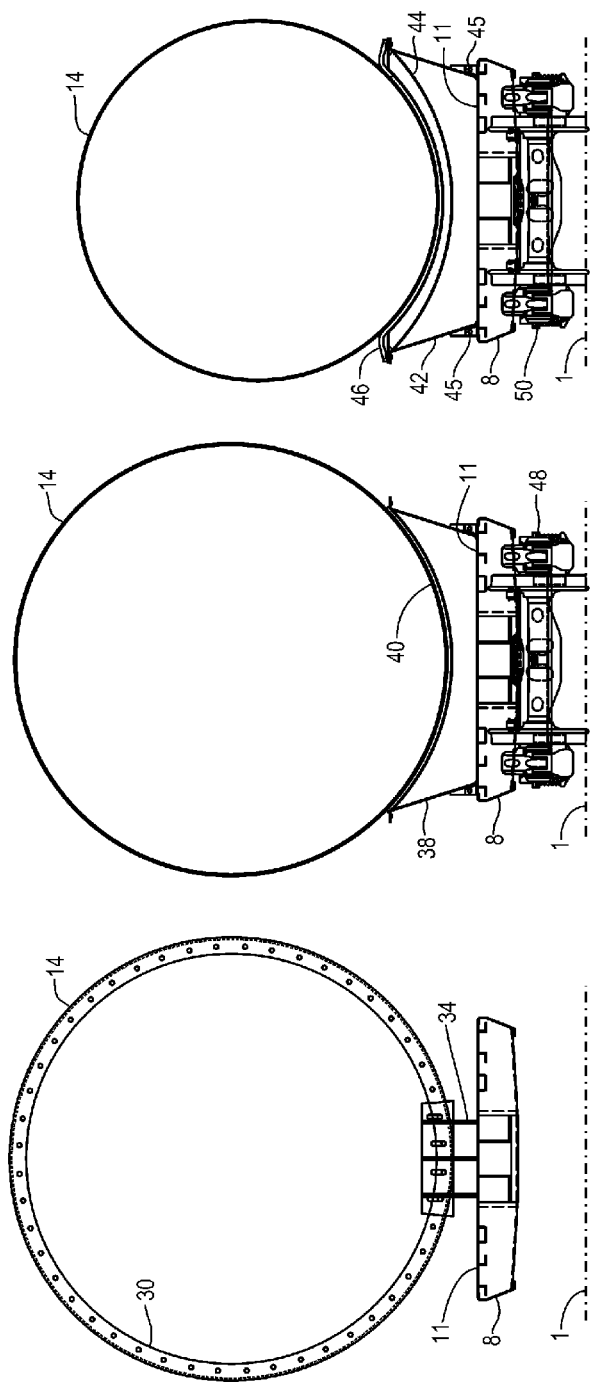

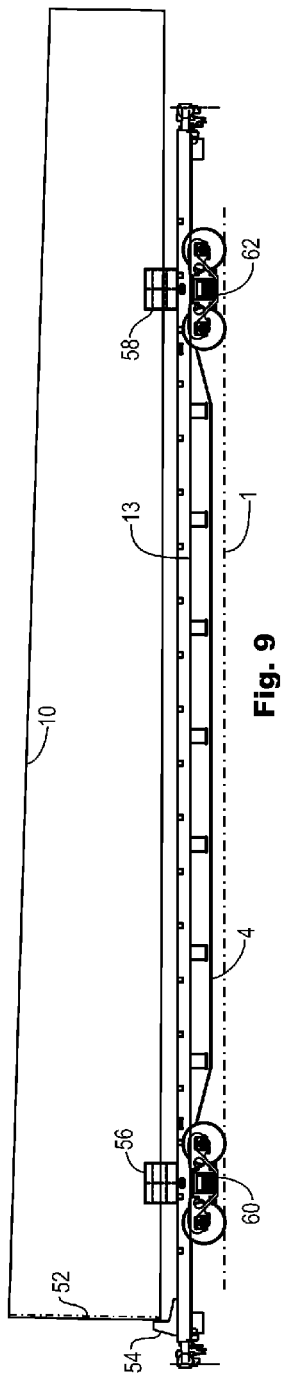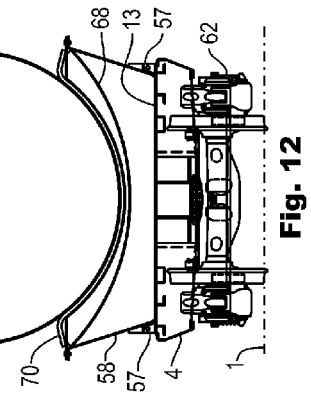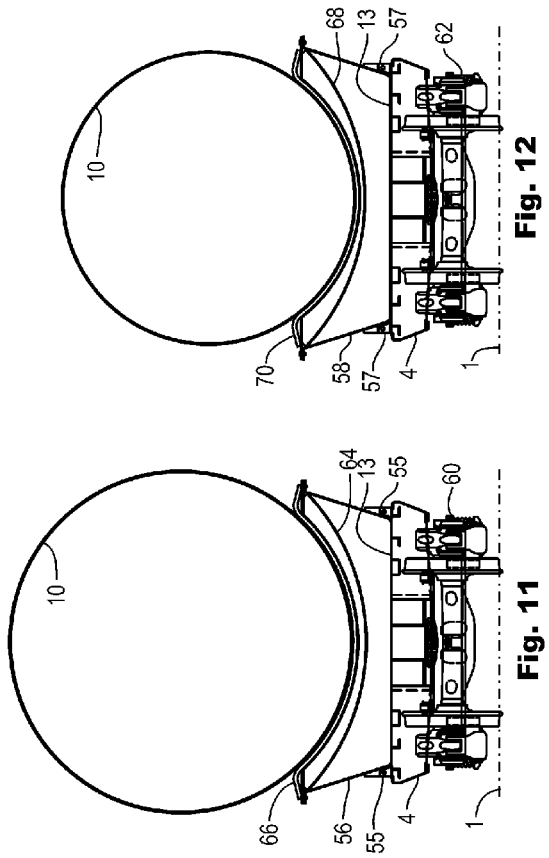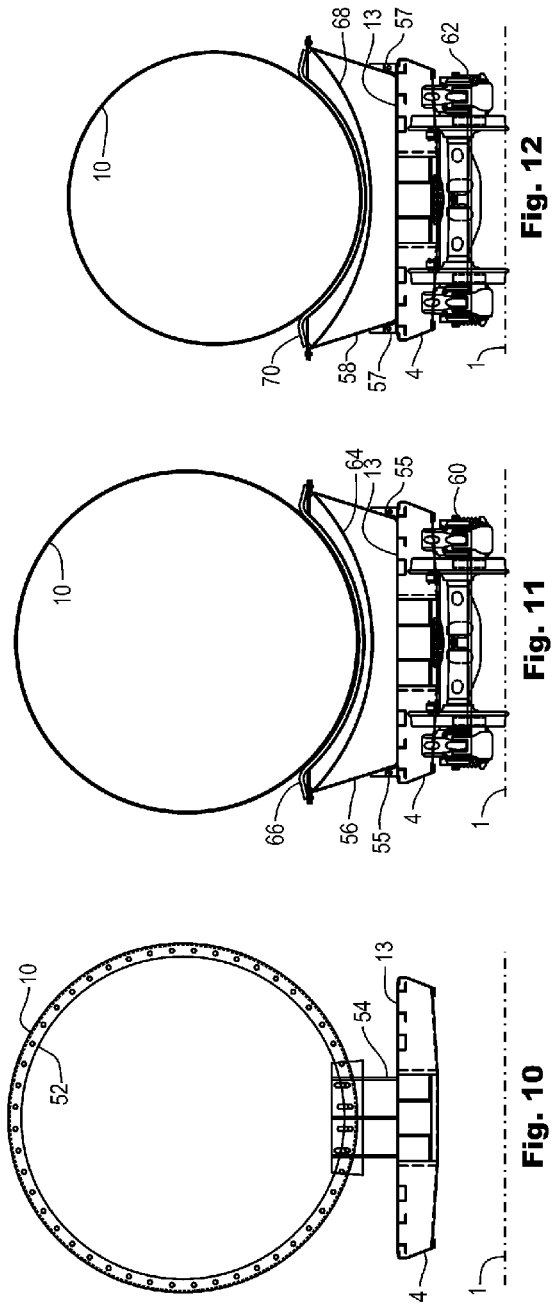

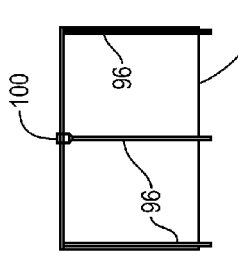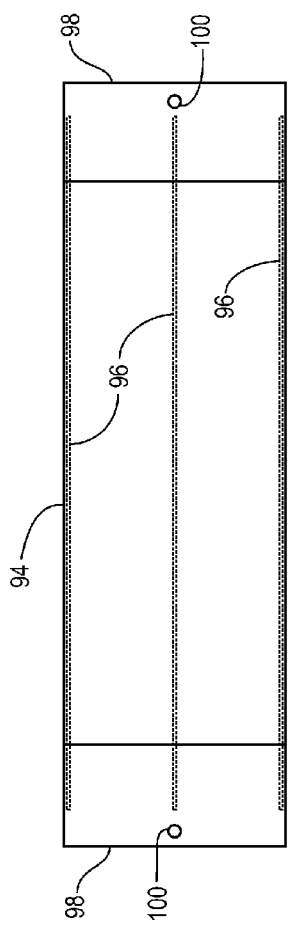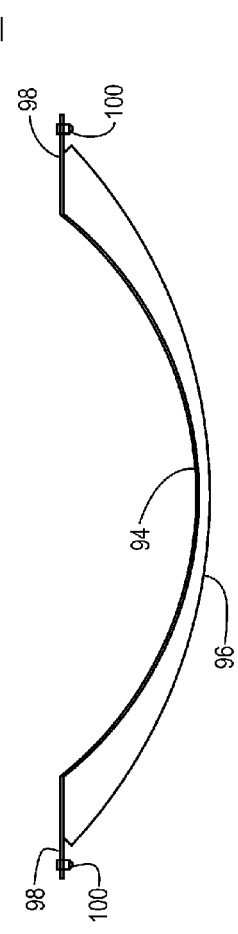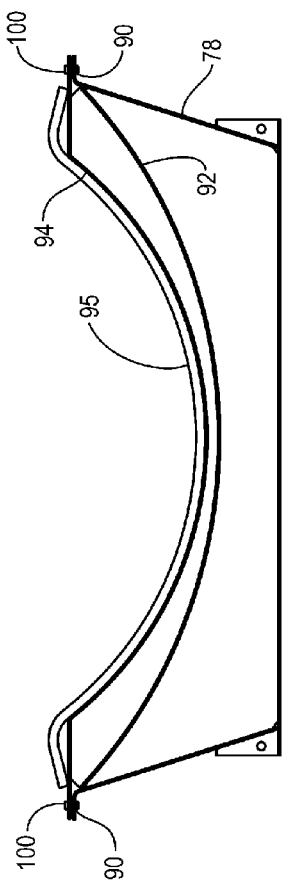

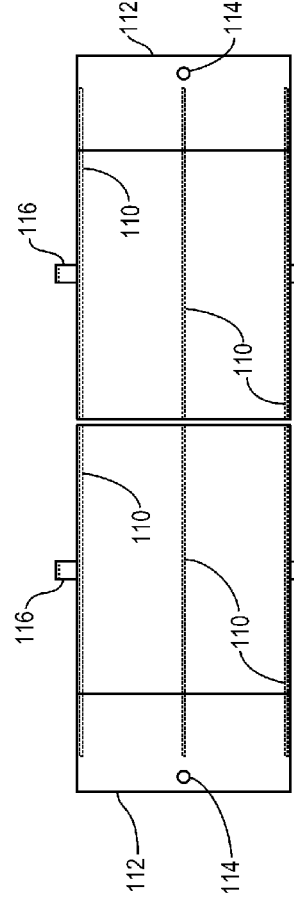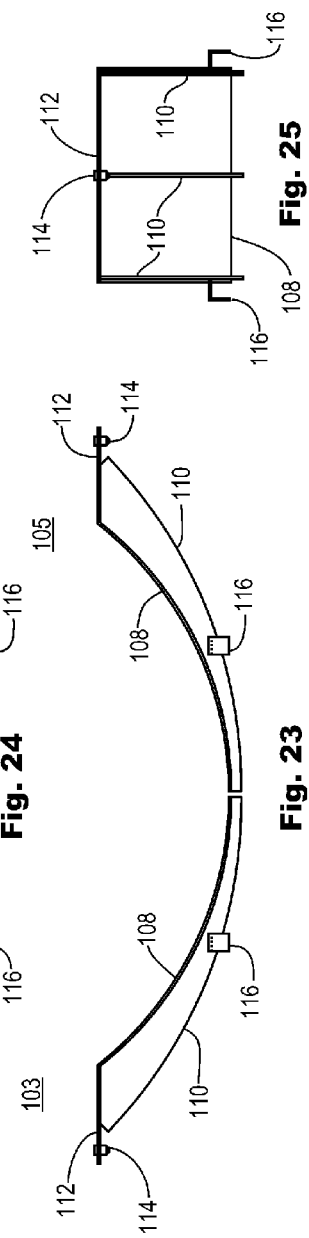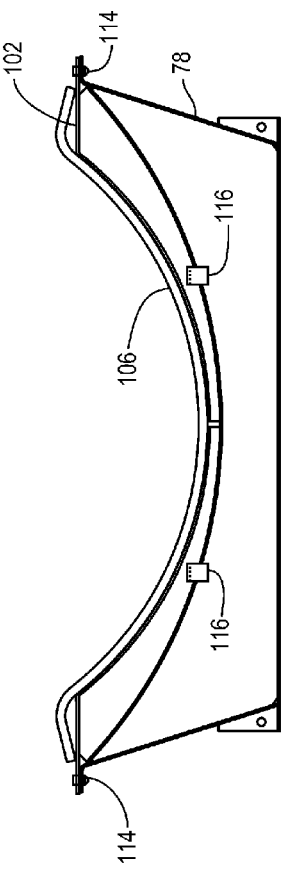

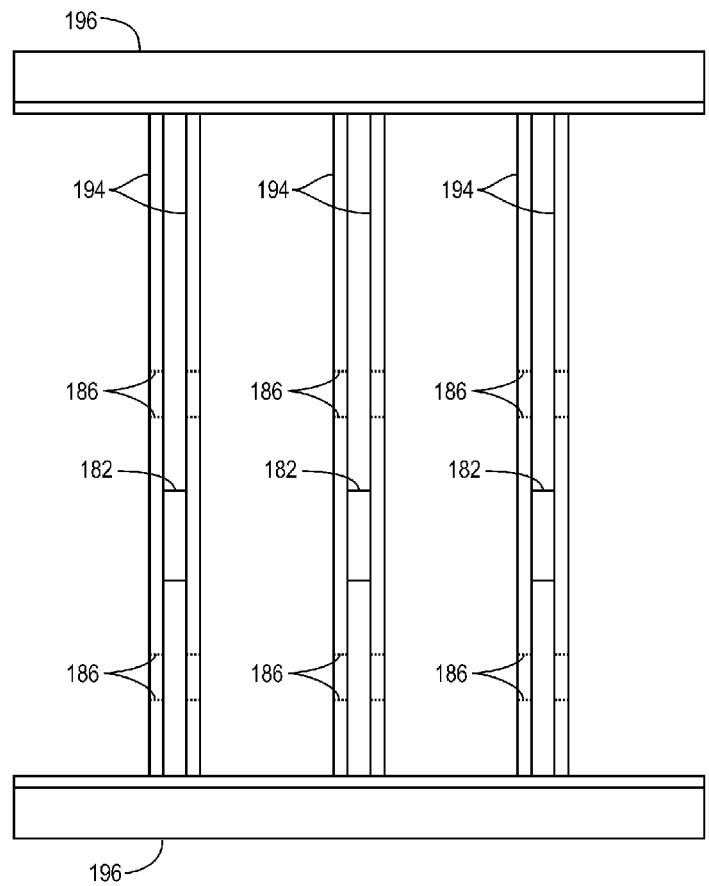
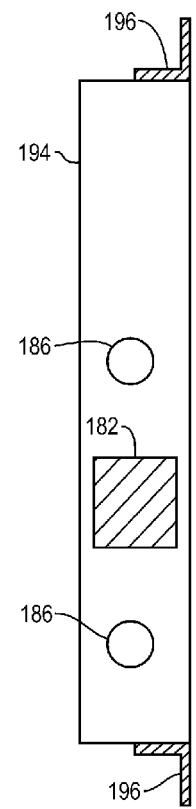
Fig. 35A          Fig. 35C
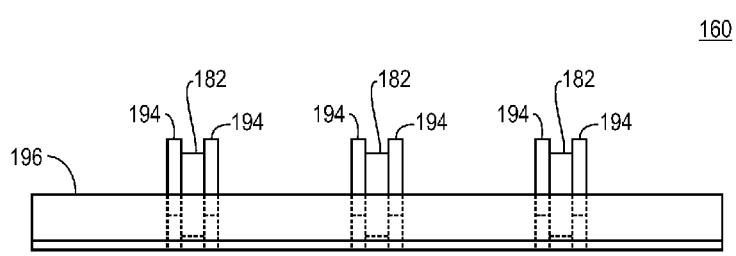
Fig. 35B

LARGE TOWER RAILROAD TRANSPORTATION SYSTEM AND METHOD

RELATED APPLICATIONS

This is a Continuation-in-Part of U.S. application Ser. No. 12/539,008 filed on Aug. 11, 2009.

BACKGROUND OF THE INVENTION

1. Field of the Invention

The present invention relates to transporting large towers. More specifically, the present invention relates to a system and method for transporting large monopole towers and tower sections, such as towers used to support commercial wind turbines, using one or more railcars.

2. Description of the Related Art

Large-scale wind turbines are used to generate electrical power. Such wind turbines consist of a tall tower with a generator nacelle rotatably coupled about the top of tower's vertical axis. A rotor hub extends out a horizontal axis of the nacelle. Two or more turbine blades are connected to the rotor hub at right angles to the horizontal axis. During operation, prevailing winds cause the turbine blades to rotate about the rotor hub's horizontal axis. The rotational forces are coupled to a generator within the nacelle, which produces electricity. The nacelle rotates about the vertical axis of the tower to maintain the wind turbine blades in proper orientation to the direction of the prevailing winds.

The various components of a large-scale wind turbine may be manufactured at different geographic locations, which may be anywhere in the world. For example, a manufacturer who wishes to assemble a wind turbine generator tower in the United States may have the towers manufactured in Korea, the nacelles manufactured in Denmark and the blades manufactured in Germany. These components must then be transported to the ultimate power generation site, assembled, erected, and placed into operation. Since the manufacturing operations may be spread across the world, transportation of the components to the generation site may utilize all modes of transportation, including ships, barges, trains and trucks. The various components are expensive to manufacture, and include delicate components that must be protected and handled properly during transportation. The transportation issues are exacerbated in that the components may be transported using plural modes during their journey. For example, a wind turbine tower manufactured in Korea may travel by ship across the ocean, then via railroad to a location in the geographic area of the generation site, and then finally by truck to the ultimate destination. Mounting fixtures are needed to adapt the particular component being transported to each mode of transportation.

The evolution of technology and the economies of scale have lead to the development and deployment of large-scale wind turbines with larger and larger proportions. The power generation capacity of a large-scale wind turbine is directly related to the length of the turbine blades, which define the swept area and power capacity of the turbine. The turbine blade proportions, in turn, are determinative of the tower height, as are the prevailing wind conditions. Tower height and wind loading establish the tower's strength requirement. Generally, wind turbine towers will taper from the base to the top, as this provides the requisite strength with the minimum of material and fabrication cost. Transportation and fabrication constraints commonly dictate that tall towers be separated into plural tower sections, which are finally assembled at the generation site. Transportation of long towers and tower section presents significant challenges to transportation engineers, particularly in the case of railroads, where the railroad profile is tightly limited and the trains must traverse curved sections and complex rail yards. Additionally, the requirement to fix towers and tower sections to railcars during transport, particularly given the tapered profile, creates the need for specialized fixtures, and the corresponding expense in their fabrication and utilization. Thus it can be appreciated that there is a need in the art for a system and method addressing the problems related to transportation of long and heavy towers and tower sections via rail.

SUMMARY OF THE INVENTION

The need in the art is addressed by the systems and methods of the present invention. The present invention teaches a system for transporting a tower with a first end and an elongated portion on a railcar that has a deck for carrying a load. The system includes a locating assembly, that includes a key assembly and a foot-stop assembly, where the key assembly is adapted to be rigidly fixed to the railcar deck and disengageably coupled to the foot-stop assembly, and where the foot-stop assembly is adapted to be fixed to the tower adjacent to the first end, and where the locating assembly locates the tower above the deck of the railcar. The system also includes a saddle assembly with a base for resting upon the deck of the railcar, and a saddle that conforms to the shape of a large tower, and the saddle assembly is adapted to support the tower above the deck. Also, a spacer assembly, for disposition between the saddle of the saddle assembly at a first location along the elongated portion of the tower, and where the saddle assembly has saddle rest that conforms to the shaped of the saddle, and a spacer saddle that conforms to the shape of the elongated portion of the tower at the first location.

In a specific embodiment of the foregoing system the locating assembly includes a position key means disposed between the foot-stop assembly and the key assembly, which is adapted to fixedly locate the tower with respect to the deck of the railcar at least along the longitudinal axis of the railcar. In a refinement to this embodiment, the position key means includes a key bar and a key slot. In another refinement, the key position means includes a key bar disposed on the key assembly and a key slot disposed on the foot-stop assembly.

In a specific embodiment of the foregoing system, the locating assembly includes plural pin holes dispose between the key assembly and the foot-stop assembly. The system additionally includes at least a first pin for insertion through at least a portion of the plural pins holes, which is used to fixedly aligning and couple the foot-stop assembly to the key assembly.

In a specific embodiment of the foregoing system the key assembly is welded to the deck of the railcar and the foot-stop assembly is bolted to the first end of the tower.

In a specific embodiment of the foregoing system the foot-stop assembly is configured with a vertical height selected to accommodate a predetermined distance between the deck of the railcar and the first end of the tower section.

In a specific embodiment of the foregoing system, the foot stop assembly further includes a foot portion rigidly connected to a mounting portion, and the foot portion is adapted to engage the key assembly, and the mounting portion is adapted to engage the first end of the tower. In a refinement to this embodiment, the mounting portion is a flange with plural bolt holes.

In a specific embodiment of the foregoing system, where the tower includes a mount attached to the first end, the foot assembly also includes a mount engagement means configured to engage the mount so as to resist movement along the longitudinal axis of the railcar and also resist rotation of the tower about the tower's longitudinal axis. In a refinement to this embodiment, the mount includes a horizontal support surface, and the mount engagement means is a recess formed in the top of the foot-stop assembly shaped to partially conform to the shape of the horizontal support surface.

The present invention also teaches a method for transporting a tower that has a first end and an elongated portion, on a railcar that has a deck for carrying a load, using a locating assembly including a key assembly and a foot-stop assembly, and a saddle assembly having a base and a saddle that conforms to the shape of a large tower, and a spacer assembly that has a saddle rest that conforms to the shaped of the saddle, and a spacer saddle that conforms to the shape of the elongated portion of the tower. The method includes rigidly fixing the key assembly to the railcar deck, fixing the foot-stop assembly to the tower adjacent to the first end, and disengageably coupling the foot-stop assembly to the locating assembly, thereby locating the tower above the deck of the railcar. The method also includes resting the base of the saddle assembly on the deck of the railcar and engaging the saddle rest of the spacer assembly with the saddle of the saddle assembly, and also aligning the spacer saddle to conformally engage the elongated portion of the tower at a second location, and thereby supporting the tower above the railcar deck.

The a specific embodiment of the foregoing method, where the locating assembly includes a position key means disposed between the foot-stop assembly and the key assembly, the method further includes engaging the position key means thereby fixedly locating the tower with respect to the deck of the railcar at least along the longitudinal axis of the railcar. In another specific embodiment, the engaging the position keys means step is accomplished using a key bar and a key slot.

In a specific embodiment of the foregoing method, where the locating assembly includes plural pin holes dispose between the key assembly and the foot-stop assembly, the method includes inserting at least a first pin through at least a portion of the plural pins holes, thereby fixedly aligning and coupling the foot-stop assembly to the key assembly.

In a specific embodiment, the foregoing method further includes welding the key assembly the deck of the railcar, and bolting the foot-stop assembly to the first end of the tower. In another specific embodiment, the method further includes selecting a foot-stop assembly having a vertical height accommodating a predetermined distance between the deck of the railcar and the first end of the tower section.

In a specific embodiment of the foregoing method, where the tower includes a mount attached to the first end, and the foot assembly includes a mount engagement means, the method further includes engaging the mount with the mount engagement means, thereby resisting movement along the longitudinal axis of the railcar and resisting rotation of the tower about the tower's longitudinal axis.

BRIEF DESCRIPTION OF THE DRAWINGS

FIG. 1 is a drawing of a train carrying a three-section tower according to an illustrative embodiment of the present invention.

FIG. 2 is a side view drawing of a tower section loaded on a railcar according to an illustrative embodiment of the present invention.

FIG. 3 is a section view drawing of a tower section loaded on a railcar according to an illustrative embodiment of the present invention.

FIG. 4 is a section view drawing of a tower section loaded on a railcar according to an illustrative embodiment of the present invention.

FIG. 5 is a side view drawing of a tower section loaded on a railcar according to an illustrative embodiment of the present invention.

FIG. 6 is a section view drawing of a tower section loaded on a railcar according to an illustrative embodiment of the present invention.

FIG. 7 is a section view drawing of a tower section loaded on a railcar according to an illustrative embodiment of the present invention.

FIG. 8 is a section view drawing of a tower section loaded on a railcar according to an illustrative embodiment of the present invention.

FIG. 9 is a side view drawing of a tower section loaded on a railcar according to an illustrative embodiment of the present invention.

FIG. 10 is a section view drawing of a tower section loaded on a railcar according to an illustrative embodiment of the present invention.

FIG. 11 is a section view drawing of a tower section loaded on a railcar according to an illustrative embodiment of the present invention.

FIG. 12 is a section view drawing of a tower section loaded on a railcar according to an illustrative embodiment of the present invention.

FIG. 18 is an end view drawing of a spacer assembly engaged with a saddle assembly according to an illustrative embodiment of the present invention.

FIG. 19 is an end view drawing of a spacer assembly according to an illustrative embodiment of the present invention.

FIG. 20 is a top view drawing of a spacer assembly according to an illustrative embodiment of the present invention.

FIG. 21 is a side view drawing of a spacer assembly according to an illustrative embodiment of the present invention.

FIG. 22 is an end view drawing of a split spacer assembly engaged with a saddle assembly according to an illustrative embodiment of the present invention.

FIG. 23 is an end view drawing of a split spacer assembly according to an illustrative embodiment of the present invention.

FIG. 24 is a top view drawing of a split spacer assembly according to an illustrative embodiment of the present invention.

FIG. 25 is a side view drawing of a split spacer assembly according to an illustrative embodiment of the present invention.

FIGS. 35A, 35B, and 35 C are a top view, end view, and side view drawing, respectively, of a key assembly according to an illustrative embodiment of the present invention.

DESCRIPTION OF THE INVENTION

Figure 17:
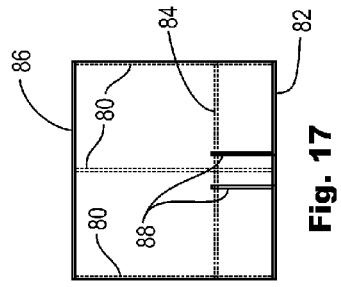
FIG. 17 is a side view drawing of a saddle assembly according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the problems in the prior art associated with railroad transportation of large towers and tower sections used in conjunction with commercial wind turbine systems. A variety of innovative mounting fixtures are employed, including tower manufacturer supplied fixtures, fixtures permanently attached to railcars, reusable fixtures, and fixture adaptors that accommodate various tower dimensions. The combination of these fixtures enables manufacturers, railroads, and rail services providers to accommodate virtually any tower configuration using the fewest possible number of fixtures types. Additionally, a greater number of the fixture components are reusable than in prior art systems, which substantially reduces costs. Through application of the teachings herein, there is less welding and cutting to and from the railcar decks, which improves utilization of the rolling stock and shortens turn-around time for loads.

Reference is directed to FIG. 1, which is an elevation drawing of a train 2 transporting a three-section tower assembly via rail 1 according to an illustrative embodiment of the present invention. As a preliminary matter, it is to be understood that the term "tower" and "tower section" are largely interchangeable in this disclosure. In the case where a single railcar is carrying a single tower or tower section, there is no distinction between the two. The distinction only exists at the time the tower is erected, which occurs after the tower or tower section has been unloaded from the railcar. In the case where a tower assembly comprises plural tower sections, and where all the tower sections are transported using a single train, then the distinction between a tower and a tower section is worth noting, in that there may be coordinated aspects of the loading and unloading of the tower sections. FIG. 1 illustrates this point.

The train 2 in FIG. 1 comprises three railroad flatcars 4, 6, and 8 traversing railroad 1. The tower assembly comprises three tower sections, which generally taper from the base to the top. Tower section 12 is the base of the tower assembly, which has the largest section diameter. The base tower section 12 is loaded onto the center flatcar 6, and is disposed toward one end of the flatcar 6, clearing an open area at the opposite end of the flatcar 6. The middle tower section 14 is loaded onto flatcar 8, and has a length that consumes substantially the entire length of flatcar 8. The top tower section 10 is loaded onto flatcar 4. Note that the length of the top tower section 10 is longer than the length of the flatcar 4. The top tower section 10 is therefore disposed upon the flatcar 4 such that one end of the top tower section 10 extends over the next coupled flatcar 6. This explains the need to dispose the base tower section 12 toward one end of its flatcar 6, as this space provides clearance from the overhang of the top tower section 4. Those skilled in the art will appreciate that flatcars 4 and 6 serve as convention "load" cars, and that flatcar 6 serves as both a load car and an "idler" car, in that flatcar 6 provides clearance for the unsupported load of flatcar 4. Other tower assembles with other numbers of tower sections, and lengths can readily be accommodated by the teachings of the present invention, and FIG. 1 serves as just one illustrative embodiment.

Reference is directed to FIG. 2, which is a side view drawing of a tower section 12 loaded on a railcar 6 according to an illustrative embodiment of the present invention.

FIG. 2 illustrates the aforementioned base tower section 12 on the center flatcar 6 of the train in FIG. 1. The railcar 6 is a standard 90-foot flatcar with two conventional bolsters 18, 20. The base tower section 12 is provided from the manufacturer with one fixed mounting foot 24, which is retained to the deck 7 of the flatcar 6 with welded retainers (not shown) as are know to those skilled in the art. The opposite end of the base tower section 12 is supported with a non-manufacturer provided mounting foot 22. Foot 22 may be provided by a rail services company. In this illustrative embodiment, the mounting foot 22 is welded to the deck 7 of the flatcar 6, and retains the tower section 12 against movement in all three axes. Note that foot 22 is positioned over bolster 18 and foot 24 is position between bolster 20 and the end coupler 9. Consideration is to be given to the weight of tower section 12 and the concentrated loads applied to the deck 7 of the railcar 6, as is understood by those skilled in the art.

Reference is directed to FIG. 3, which is a section view drawing of tower section 12 loaded on flatcar 6 at bolster 18 according to an illustrative embodiment of the present invention. The section view is taken at the position of the mounting foot 22 and bolster 18. The end of the tower section 12 includes an external flange 26 with a plurality of bolt holes therethrough. The mounting foot 22 includes a plate with slotted holes, which align with the bolt holes in flange 26. Plural bolts (not shown) are used to connect the mounting foot 22 to the flange 26, thereby supporting the tower section 12 above the deck 7 of the flatcar 6. The mounting foot 22 also include plural gussets that are welded to the deck 7 of the flatcar 6.

Reference is directed to FIG. 4, which is a section view drawing of tower section 12 loaded on flatcar 6 at mounting foot 24 according to an illustrative embodiment of the present invention. The manufacturer provided mounting foot 24 has been previously connected to an internal flange 28 of the tower section 12. The foot 24 is connected to the deck 7 of the flatcar 6. The techniques for connection are known to those skilled in the art.

Reference is directed to FIG. 5, which is a side view drawing of the middle tower section 14 loaded on flatcar 8, previously referenced in FIG. 1, according to an illustrative embodiment of the present invention. Flatcar 8 is a conventional 90-foot flatcar with a pair of conventional bolsters 48, 50, and a load deck 11. In this embodiment, the tower section 14 has a length approximately as long as the flatcar 8 deck 11, and therefore does not overhang the deck 11, nor does it provide any clearance for adjacent load overhang. The middle tower section 14 includes an internal flange 30 on its larger circumference end, which engages the base tower section when the tower is finally assembled. The flange 30 is also used as an attachment point for the stop 34 disposed between the deck 11 of the flatcar 8 and the tower section 14 during transit. The stop 34 retains the tower section 14 against longitudinal movement with respect to the flatcar 8. To a lesser extend, the stop 34 also retains the tower section 14 against lateral movement, and the primary lateral support is by saddles assemblies 38, 42. The weight of the tower section 14 is supported by a first saddle assembly 38 located over bolster 48, and a second saddle assembly 42 located over bolster 50. The second saddle assembly 42 also includes a spacer assembly, discussed further hereinafter. It is preferable to locate the saddles assembles 38, 42 over the bolster 48, 50 because the weight of the tower is transferred more directly to the underlying rails 1. This arrangement mitigates any issues with respect to concentrated loads placed upon the flatcar 8, provided that the total loading does not exceed railroad and railcar design limits, as are known to those skilled in the art.

Reference is directed to FIG. 6, which is a section view drawing of tower section 14 loaded on railcar 8, as described with respect to FIG. 5, and according to an illustrative embodiment of the present invention. The section view is taken at the location of the flange 30 end of tower section 14. The internal flange 30 of the tower section 14 is visible. After the tower section 14 is loaded onto the flatcar 8, plural connecting bolts join the flange 30 to the stop 34, which has previously been fixed to the deck 11, such as by welding or other suitable means. As illustrated, the stop 34 is comprised of an attachment plate bolted to the flange 30, and of plural gusset plates welded to the attachment plate and the deck 11 of the flatcar 8. Those skilled in the art will appreciate that other stop designs could be envisioned that provide the requisite retention of the tower section 14 against longitudinal and lateral movement.

Reference is directed to FIG. 7, which is a section view drawing of tower section 14 loaded on railcar 8 according to an illustrative embodiment of the present invention. The section view is taken at the position of bolster 48 of the flatcar 8, which is also the location of saddle assembly 38. The saddle assembly 38 is fixed to the deck 11 of the flatcar 14. There are various means for fixing the saddle assembly and deck together, which will be more fully discussed hereinafter. The upper surface of the saddle assembly 38 is a saddle that conforms to the shape of the tower section 14 at a location along the elongated portion of the tower section at which the saddles assembly engages. Since the tower 14 in this illustrative embodiment is circular in cross section, the saddle 38 is an arcuate circular section, conforming to the exterior shape of the tower section 14. In this illustrative embodiment, the engagement point is adjacent to the largest end of the tower section 14. Since the tower assembly generally tapers, saddle assembly 38 has the largest arcuate diameter required to support this tower assembly. Note that a resilient saddle liner 40 is disposed between saddle assembly 38 and the surface of the tower section 14. The liner 40 serves to protect the surface finish of the tower section 14 and to accommodate small variances between the to two surface shapes. The resilient liner can be fabricated from any suitable material known to those skilled in the art, such as rubber, synthetic rubber, polymeric foams, or other synthetic materials possessing the requisite resilient characteristics.

Reference is directed to FIG. 8, which is a section view drawing of tower section 14 loaded on railcar 8 according to an illustrative embodiment of the present invention. This section view is taken at the location of bolster 50, which is also the location of saddle assembly 42. Saddle assembly 42 is substantially the same as saddle assembly 38 of FIG. 5. The advantage of making the saddle assemblies the same is lower production costs, reduced inventory overhead, and greater utilization of assets. The need to accommodate different sizes and shapes of tower cross sections are addressed by employing particular spacer assemblies. In FIG. 8, spacer assembly 44 is positioned on top of saddle assembly 42, and adapts the conformal shape of the saddle assembly 42 to the exterior shape of the tower section 14 at the location of support of saddle assembly 42. Since the tower section 14 has a smaller diameter at the location of saddle assembly 42, the spacer assembly 44 presents a correspondingly smaller diameter spacer saddle profile. Note that a resilient liner 46 is disposed between the spacer assembly saddle 44 and the tower 14. Also note that the saddle assembly 42 is fixed to the deck 11 of the flatcar 8 using pins disposed between fixed deck brackets and gussets on the saddle assembly (see reference numeral 45 generally, which will be more fully detailed hereinafter).

Reference is directed to FIG. 9, which is a side view drawing of the upper tower section 10 loaded on flatcar 4, as previously referenced in FIG. 1, and according to an illustrative embodiment of the present invention. Flatcar 4 is a conventional 90-foot flatcar with a pair of conventional bolsters 60, 62, and a load deck 13. In this embodiment, the tower section 10 has a length this is substantially longer than the deck 13 of the flatcar 4. The tower section 10 is arranged to overhang one end of the flatcar 4, and thusly requires clearance on an adjacent flatcar (not shown) in the train. As was discussed with respect to the flatcar 6 and tower section 12 hereinbefore, the requisite clearance is provided by shifting the position of tower section 12 on the adjacent flatcar. The upper tower section 10 includes an internal flange 52 on its larger circumference end, which engages the middle tower section when the tower is finally assembled. The flange 52 is also used as an attachment point for the stop 54 disposed between the deck 13 of the flatcar 8 and the tower section 14 during transit. The stop 54 retains the tower section 10 against longitudinal movement with respect to the flatcar 4. To a lesser extend, the stop 54 also retains the tower section 10 against lateral movement. The weight of the tower section 10 is supported by first saddle assembly 56 located over bolster 60, and a second saddle assembly 58 located over bolster 62. Both saddle assemblies 56, 58 also include corresponding spacer assemblies, discussed further hereinafter. Since all of the saddle assemblies for this tower section 10, and the tower section 14 are substantially the same, and since the tower sections gradually taper, the spacers accommodate the gradual reduction on the tower circumference, thereby maintaining a proper conformal fit to the tower sections at every support location.

Reference is directed to FIG. 10, which is a section view drawing of tower section 10 loaded on railcar 4, as described with respect to FIG. 9, according to an illustrative embodiment of the present invention. The section view is taken at the location of the flange 52 end of tower section 10. The internal flange 52 of the tower section 10 is visible. After the tower section 10 is loaded onto the flatcar 4, plural connecting bolts join the flange 52 to the stop 54, which has previously been fixed to the deck 13, such as by welding or other suitable means. As illustrated, the stop 54 is comprised of an attachment plate bolted to the flange 52, and of plural gusset plates welded to the attachment plate and the deck 13 of the flatcar 4. Those skilled in the art will appreciate that other stop designs could be envisioned that provide the requisite retention of the tower section 10 against longitudinal and lateral movement.

Reference is directed to FIG. 11, which is a section view drawing of tower section 10 loaded on railcar 4 according to an illustrative embodiment of the present invention. The section view is taken at the position of bolster 60 of the flatcar 4, which is also the location of saddle assembly 56. The saddle assembly 56 is fixed to the deck 13 of the flatcar 4. There are various means for fixing the saddle assembly and deck together as will be appreciated by those skilled in the art. In this illustrative embodiment, a combination of fixed deck brackets, gussets on the saddle assembly, and pins or bolts (see reference numeral 55 generally) are employed to removably fix the saddle assembly 56 to the deck 13. The upper surface of the saddle assembly 56 is a saddle that conforms to the largest shape of tower section 14, discussed hereinbefore. The smaller circumference of tower section 10, at the location at which saddle assembly 56 provides support, is accommodated with spacer assembly 64. Spacer assembly 64 adapts from the larger arcuate diameter of the saddle of saddle assembly 56 to the actual arcuate diameter of the exterior of tower section 10 at the point of support. Also, a resilient saddle liner 66 is disposed between saddles assembly 64 and the surface of the tower section 10.

Reference is directed to FIG. 12, which is a section view drawing of tower section 10 loaded on railcar 4 according to an illustrative embodiment of the present invention. The section view is taken at the position of bolster 62 of the flatcar 4, which is also the location of saddle assembly 58. The saddle assembly 58 is fixed to the deck 13 of the flatcar 4. In this illustrative embodiment, a combination of fixed deck brackets, gussets on the saddle assembly, and pins or bolts (see reference numeral 57 generally) are employed to removably fix the saddle assembly 58 to the deck 13. The upper surface of the saddle assembly 58 is a saddle that conforms to the largest shape of tower section 14, discussed hereinbefore. The smaller circumference of tower section 10, at the location at which saddle assembly 58 provides support, is the smallest diameter supported in this embodiment, and is accommodated with spacer assembly 68. Spacer assembly 68 adapts from the larger arcuate diameter of the saddle of saddle assembly 58 to the actual arcuate diameter of the exterior of tower section 10 at the point of support. Also, a resilient saddle liner 70 is disposed between saddles assembly 64 and the surface of the tower section 10.

Figure 14:
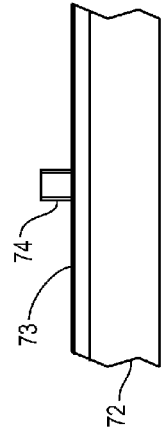
FIG. 14 is a partial side view drawing of a railroad flatcar.
Figure 13:
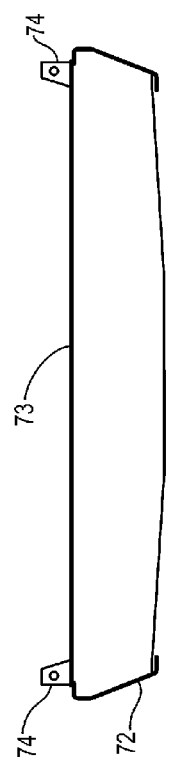
FIG. 13 is a section view drawing of a railroad flatcar.

Reference is directed to FIG. 13 and FIG. 14, which are an end section view and a side section view drawing, respectively, of a railroad flatcar 72 with a pair of attachment brackets 74 attached thereto, and according to an illustrative embodiment of the present invention. The brackets 74 are configured using steel plate bent to form a box-like shape with one surface angled to match the angle of the saddle assembly side plate. A hole is formed through the bracket 74 to accept a pin or bolt, which also engages a corresponding hole on a gusset of the saddles assembly, which is more fully described hereinafter. The brackets 74 are welded to the deck 73 of the flatcar 72. There is one bracket 74 on each side of the deck 73 of the flatcar 72, each engaging an opposite side of the saddle assembly.

Figure 16:
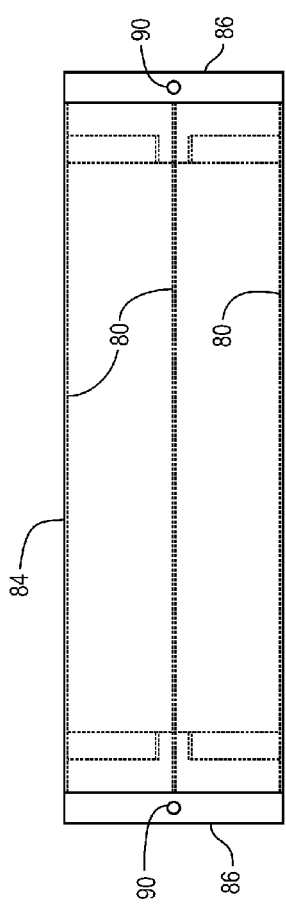
FIG. 16 is a top view drawing of a saddle assembly according to an illustrative embodiment of the present invention.
Figure 15:
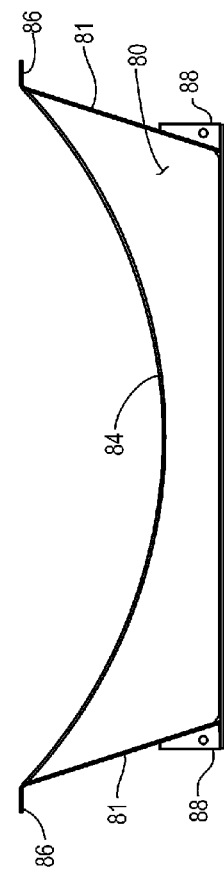
FIG. 15 is an end view drawing of a saddle assembly according to an illustrative embodiment of the present invention.

Reference is directed to FIG. 15, FIG. 16, and FIG. 17, which are an end view, top view, and side view drawing, respectively, of a saddle assembly 78 according to an illustrative embodiment of the present invention. This saddle assembly is fabricated from mild steel and is designed to accommodate the largest diameter tower section contemplated for the system. Since diameter is particularly associated with a circular cross section member, it is more appropriate to reference the saddle assembly 78 size as accommodating the largest 'circumference' of a tower section contemplated in the systems. This term more fully encompasses other tower cross-sections, which may be ellipses, ovals, triangles, squares, polygons or any other arbitrary shape. The base 82 of the saddle assembly 78 is a flat plate for engaging the flat deck of a railcar, such as a flatcar. A pair of side plates 81 extend upwardly and outwardly from the base 82 and each terminate with bend to a flange 86, which has a locator pin hole 90 formed therethrough. Three web plates 80 are disposed between the side plates 81 and the base plate 82. The upper surface of the web plates 80 are cut to match the profile of the tower section, which in this embodiment is a circular profile. A saddle plate 84 is fixed to the top of the web plates 80 and to the side plates 81 at the bend to the flanges 86. A pair of gusset plates 88 are fixed to either side of the assembly, which a corresponding cut-out in the base plate 82 to engage the deck brackets 74 discussed with respect to FIG. 13. In FIG. 15, the gusset plates 88 have holes formed therethrough to accommodate pins or bolts, which fix the saddles assembly 78 to the railcar 72 via the aforementioned deck brackets 74.

Reference is directed to FIG. 18 which is an end view drawing of a spacer assembly 92 engaged with the saddle assembly 78 described with regards to FIG. 15, and according to an illustrative embodiment of the present invention. The saddle of the saddle assembly 78 provides the support surface for the spacer assembly 92. A pair of pins 100 fixed to the spacer assembly 92 at its flanges, engages the pin holes 90 in the flanges of the saddles assembly 78, thereby locating the spacer assembly 92 with respect to the saddles assembly 78. The saddle of the spacer assembly 94 will be hereinafter referred to as the 'spacer saddle' to clearly differential it from the saddle of the saddle assembly. The lower portion of the spacer saddle 96 that engages the saddle of the saddle assembly 78 will be referred to as the 'saddle rest'. A resilient liner 95 may be disposed on the top of the spacer saddle 94 to protect the finish of the tower section (not shown) and to accommodate slight variations between the shape of the spacer saddle 94 and the shape of the tower section exterior (not shown).

Reference is directed to FIG. 19, FIG. 20, and FIG. 21, which are an end view, top view, and side view drawing, respectively, of the spacer assembly 92 discussed in regards to FIG. 18, and according to an illustrative embodiment of the present invention. The spacer assembly 92 includes a spacer saddle plate 94, which is formed to conform to the supported portion of the tower section profile, and which is terminated with a pair of bends to flanges 98 for engaging and underlying saddles assembly 78. The flanges 92 each have a locator pin 100 fixed thereto, and aligned to engage the aforementioned pin holes 90 in the saddle assembly 78. Three web plates 96 are cut to adapt between the spacer saddle plate 94 and the saddles of the saddle assembly (not shown). There is no bottom plate required from the spacer assembly 92, since there is adequate strength when the two assemblies are joined. The lower portion of the web plates 96 are referred to as the saddle rest, since they engage the underlying saddle and rest thereupon.

Reference is directed to FIG. 22 which is an end view drawing of a split spacer assembly 102 engaged with the saddle assembly 78 described with regards to FIG. 15, and according to an illustrative embodiment of the present invention. The saddle of the saddle assembly 78 provides the support surface for two halves of the split spacer assembly 102. The split spacer assembly 102 is comprised of two substantially identical halves, which together form a single function spacer assembly. The benefit of this arrangement is that each half is more compact, easier to handle, and lighter in weight, as well as stronger than a single full spacer assembly. The split spacer assembly is together have a pair of pins 114, one each fixed to each half of the split spacer assembly 102 at their flanges 112, which engage the aforementioned pin holes in the flanges of the saddles assembly 78, thereby locating the split spacer assembly 92 with respect to the saddles assembly 78. However, since the split spacer assembly 102 is divided in the center of its web section, the location with respect to the saddle assembly is not as secure. To address this issue, a pair of locator clips 116 are fixed to the either side of the webs of both halves of the split spacer assembly 102. The clips 116 may be short sections of angle iron that are fixedly positioned to engage the sides of the saddles assembly 118, thereby preventing movement and retaining the split spacer 102 halves on the saddles assembly 78. A resilient liner 106 may be disposed on the top of the spacer saddle 94 to protect the finish of the tower section (not shown) and to accommodate slight variations between the shape of the spacer saddle 94 and the shape of the tower section exterior (not shown).

Reference is directed to FIG. 23, FIG. 24, and FIG. 25, which are an end view, top view, and side view drawing, respectively, of the split spacer assembly 102 discussed in regards to FIG. 22, and according to an illustrative embodiment of the present invention. The split spacer assembly 102 includes the two halve 103 and 105, which are essentially identical. Each half 103, 105 includes a spacer saddle plate 108, which is formed to conform with the requisite tower section profile, and which is terminated with a bend to a flange 112 for engaging the underlying saddles assembly. The flanges 112 each have a locator pin 114 fixed thereto, and aligned to engage the aforementioned pin holes in the saddle assembly 78. Each half includes three web plates 110 that are cut to adapt between the spacer saddle plate 108 and the saddle of the saddle assembly (not shown). There is no bottom plate required for the split spacer assembly halves 103, 105, since there is adequate strength when the three assemblies are joined. Each split saddle halve 103, 105 includes a pair of locator clips 116 that car short lengths of angle iron or bent plate, and which are welded to the web plates 110, and aligned as described hereinbefore.

Figure 26:
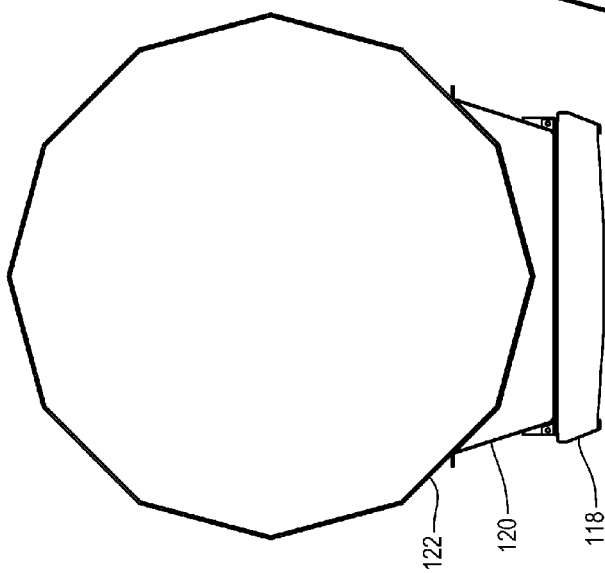
FIG. 26 is a section view drawing of a tower loaded on a flatcar according to an illustrative embodiment of the present invention.

Reference is directed to FIG. 26, which is a section view drawing of a tower 122 loaded on a flatcar 118 according to an illustrative embodiment of the present invention. This illustrative embodiment presents an application of the present invention for use with a polygonal tower profile 122. The saddle assembly 120 includes a saddle that conforms to the shape of the tower, but is otherwise the same design, which has been described hereinbefore.

Figure 27:
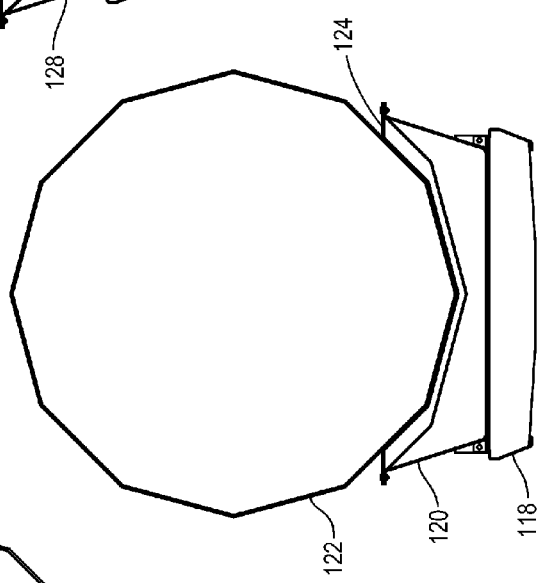
FIG. 27 is a section view drawing of a tower loaded on a flatcar according to an illustrative embodiment of the present invention.

Reference is directed to FIG. 27, which is a section view drawing of a smaller circumference portion of tower 122 loaded on the flatcar 118 discussed in regards to FIG. 26, and according to an illustrative embodiment of the present invention. This embodiment presents a spacer assembly 124 that is adapted to a polygonal tower profile 122. The lower portion of the spacer assembly 124 has a saddles rest that conforms to the polygonal saddle profile of the saddle assembly 120, and a spacer saddle that conforms to the supported portion of the polygonal tower.

Figure 28:
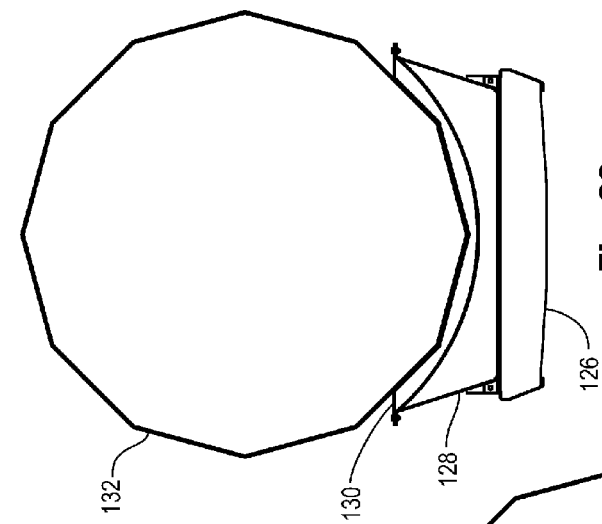
FIG. 28 is a section view drawing of a tower loaded on a flatcar according to an illustrative embodiment of the present invention.

Reference is directed to FIG. 28, which is a section view drawing of a tower 132 loaded on a flatcar 126 according to an illustrative embodiment of the present invention. This embodiment presents an application where the spacer assembly 130 adapts between two different profiles. The saddles assembly 128 includes a circular profile, as has been discussed hereinbefore. The saddle spacer 130 includes a lower saddle rest that conforms to the circular saddle, and a spacer saddles that conforms to the polygonal tower profile illustrated. These examples demonstrated that flexibility of the present inventive systems and methods.

Figure 29:
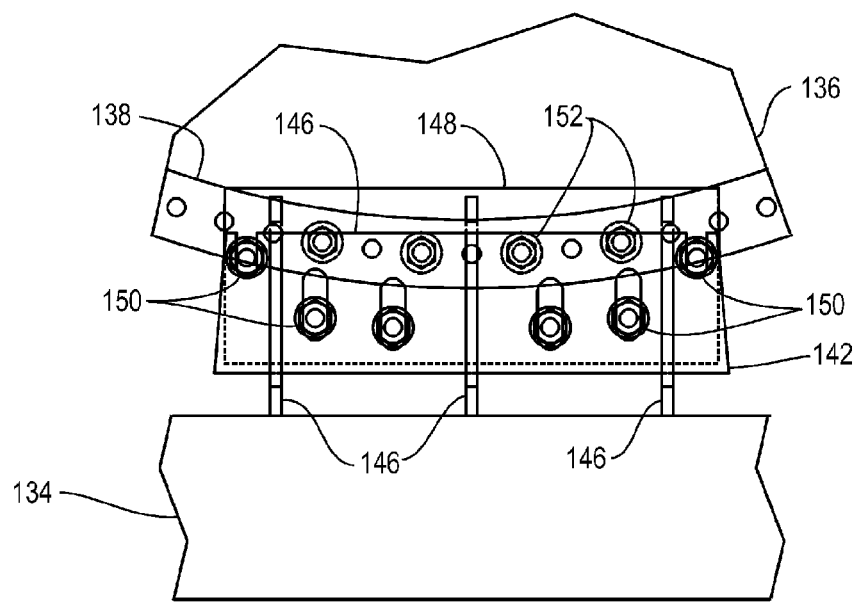
FIG. 29 is an end view drawing of an adaptable tower stop or foot according to an illustrative embodiment of the present invention.
Figure 30:
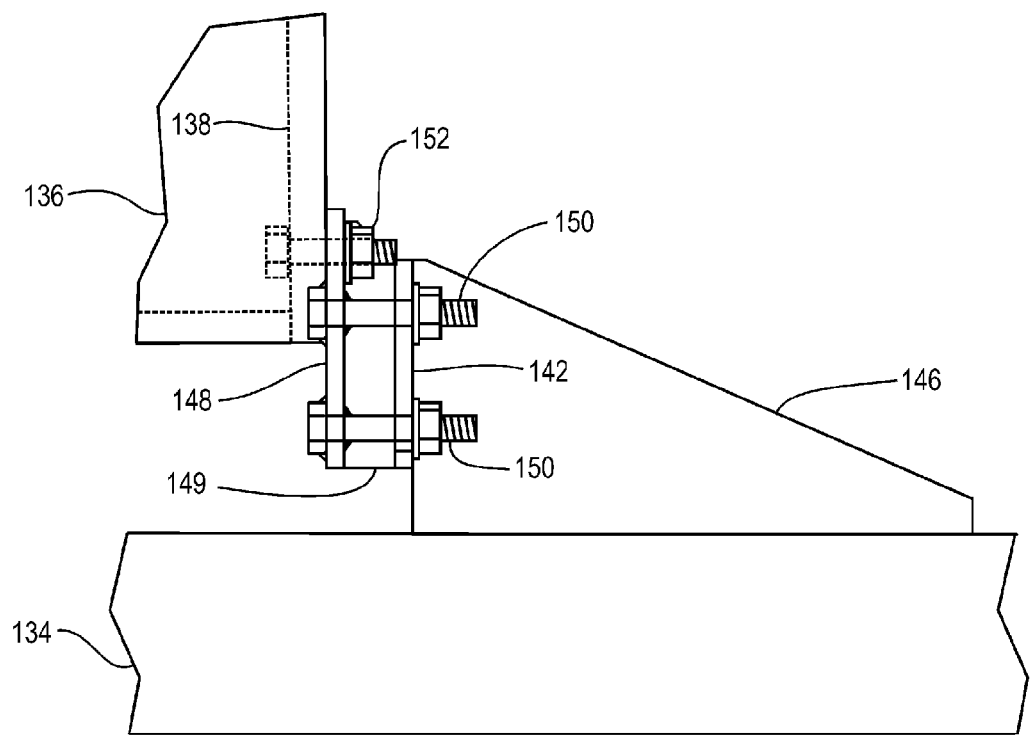
FIG. 30 is a side view drawing of an adaptable tower stop or foot according to an illustrative embodiment of the present invention.

Reference is directed to FIG. 29 and FIG. 30, which are an end view drawing and a side view drawing, respectively, of an adaptable stop or adaptable foot according to an illustrative embodiment of the present invention. The adaptable stop or foot is disposed between the railcar 134 and a tower section 136. The advantage of the adaptable stop or foot is that a deck bracket can be permanently fixed to the deck of the railcar 134, and with a suitable stop adaptor or load adaptor selected to accommodate the physical arrangement of the specific tower section being transported. The difference between a stop and a foot is that a foot is designed to carry the weight of the tower section, whereas a stop is designed to primarily resist lateral and longitudinal movement of the tower section with respect to the deck of the railcar. For the remainder of this discussion, the word 'stop' will be used, while it is understood that the structure is also applicable to a foot. The deck bracket consists of plural gusset plates 146 that are welded to the deck of the railcar 134. A mounting plate 142 is welded to the gussets 146, and has plural bolt holes for accommodating plural bolts 150. The plural bolts 150 are used to attach a stop adaptor (or load adaptor). The stop adaptor consists of an adaptor plate 148 and plural spacing ribs 149. The adaptor plate has additional bolt holes to accommodate plural mounting bolts 152, which are located and spaced to suit the particular tower section 136 that is to be transported. The tower section 136 includes a flange 138 with a bolt circle, through which the plural mounting bolts 152 are connected. In this manner, a single mounting bracket can remain fixed to the railcar, while plural stop adaptors can be utilized to adapt to plural different tower section configurations.

The foot and stop adapter 149 illustrated in FIG. 29 and FIG. 30 provide a solid and workable solution for supporting and locating the end of a tower section with respect to the deck of the railcar. However, the design must be adapted for each tower section type, and the arrangement requires the use of plural mounting bolts that are attached at the time of loading and disconnected at the time of unloading. The structure is also not self-aligning in any way, and thus requires particularly careful placement of the tower section when it is loaded onto the aforementioned support saddles at the time of loading. In addition, since many tower sections are transported intermodally there is commonly found a tower support mount in place at the end of a tower section, and this necessarily must be removed prior to utilizing the adapter 149. Thus, is can be appreciated that there is a further need in the art for an improved foot-stop mounting arrangement for both locating and supporting the end of a tower while loaded onto a railcar the employs the previously discussed saddles and saddle adapters.

Figure 31:
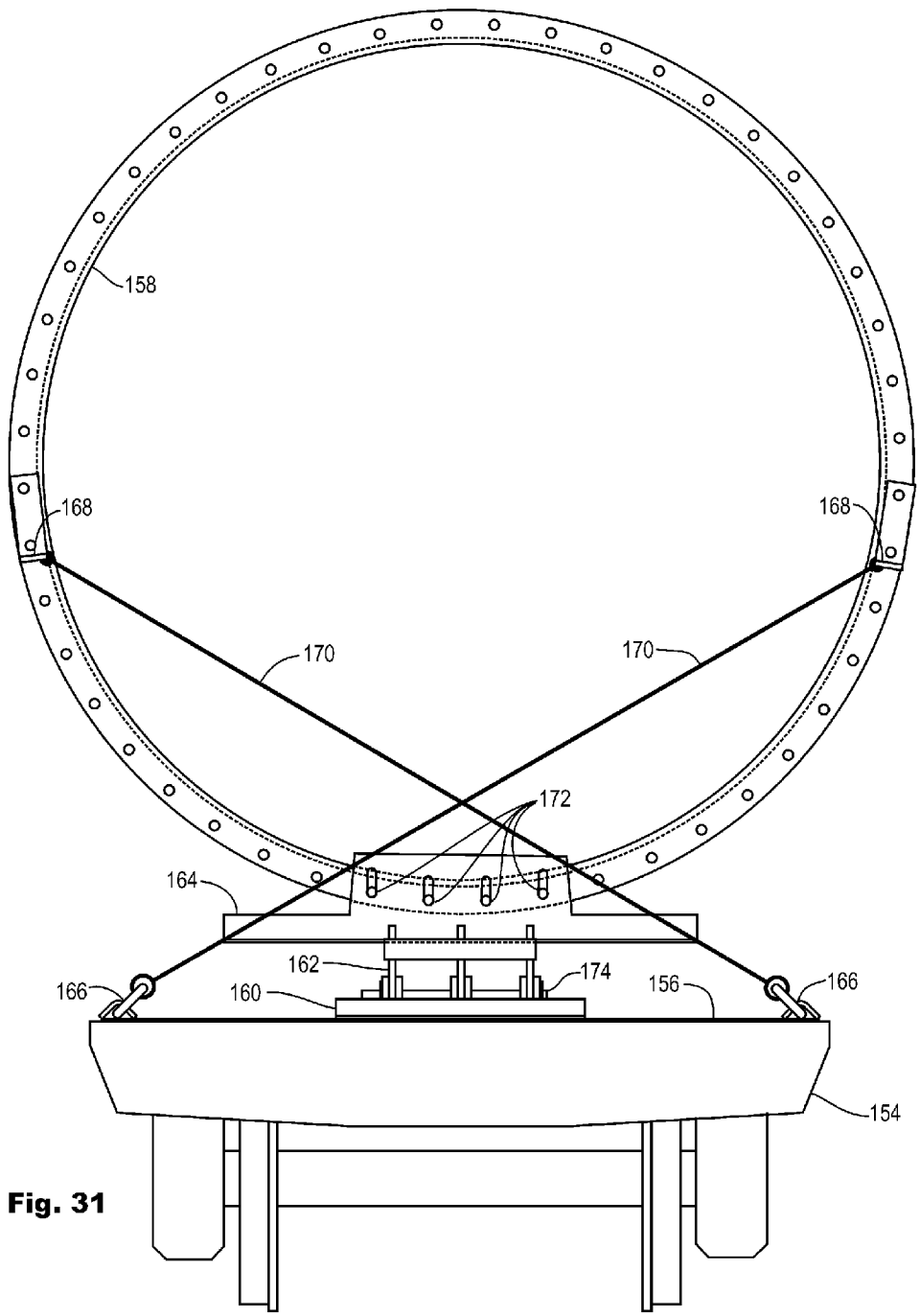
FIG. 31 is an end view drawing of a tower section loaded on a railcar according to an illustrative embodiment of the present invention.

Reference is directed to FIG. 31, which is an end view drawing of a tower section loaded on a railcar according to an improved locating assembly illustrative embodiment of the present invention. The railcar 154 may be a flatcar or other car type having a load bearing deck 156. A tower section 158 is loaded into place, and is also supported by at least one saddle assembly (not shown) as has been described hereinbefore. In this illustrative embodiment, the tower includes an existing mount 164 that is bolted 172 to the end flange of tower section 158 by others, such as by the tower manufacturer. This mount 164 is advantageously employed in the illustrative embodiment locating assembly. A key assembly 160 is fixed to the railcar 154 deck 156, such as by welding, bolting, or other suitable means. A foot-stop assembly 162 is disposed between the key assembly 160 and the existing mount 164. The key assembly 162 and foot-stop assembly 162 are connected together with plural pins 174, which will be more fully described hereinafter. The mount 164 engages a recess (not shown) in the foot-stop assembly 162 to restrain movement at least along the longitudinal axis of the railcar 154. Lateral location, vertical retention, and anti-roll engagement may also be provided. Cable attachments, such as D-rings 166, are fixed to the deck 156 and attachment brackets 168 are connected to the tower section 158. Cables or chains 170 are cross tensioned to further restrain the tower section 158 against rotation about the longitudinal axis.

Figure 32:
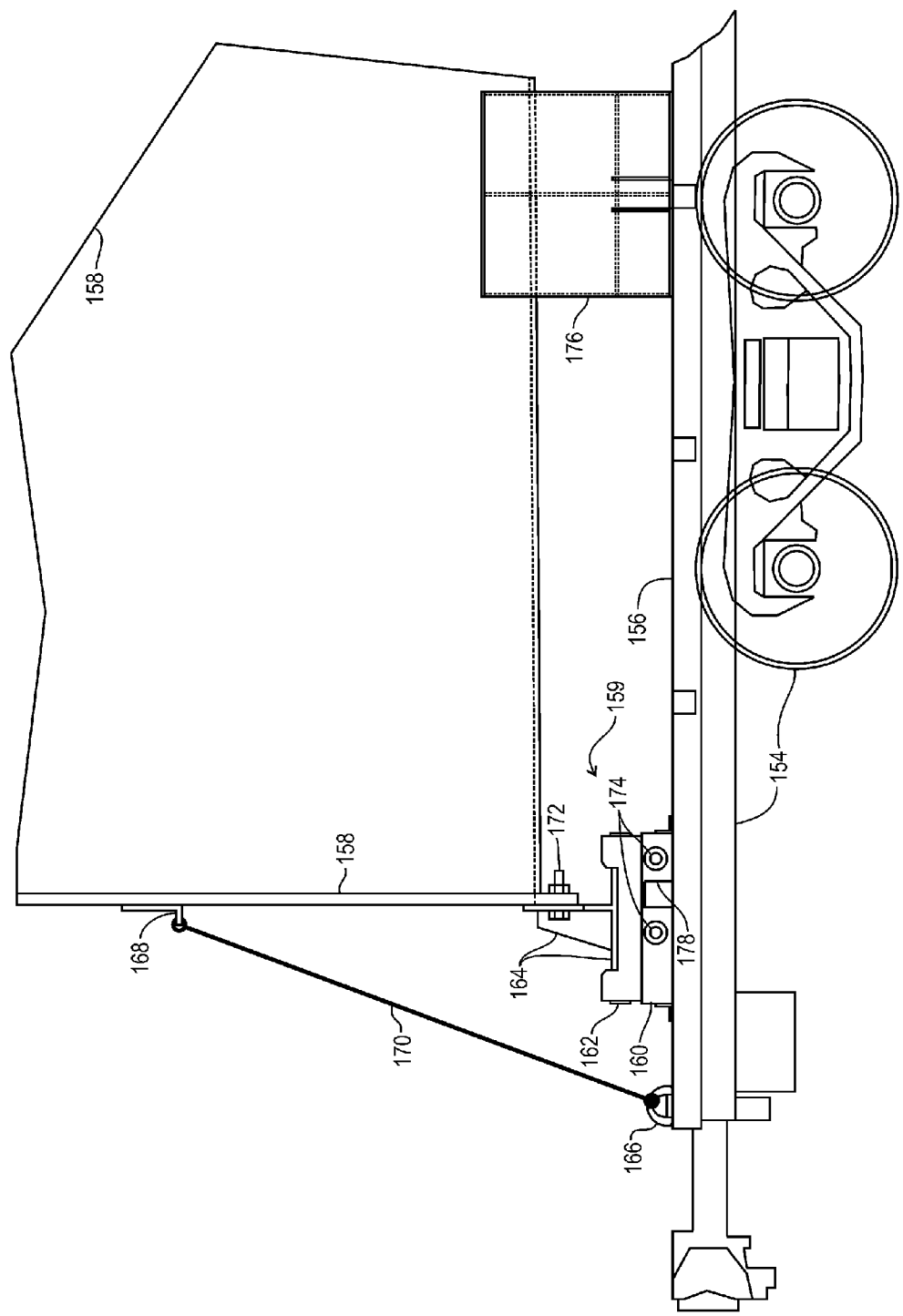
FIG. 32 is a partial side view drawing of a tower section loaded on a railcar according to an illustrative embodiment of the present invention.

Reference is directed to FIG. 32, which is a partial side view drawing of a tower section loaded on a railcar according to an illustrative embodiment of the present invention. FIG. 32 corresponds to FIG. 31. The railcar 154 is a flatcar having a load bearing deck 156. The tower section 158 is supported by a saddle assembly 176, as was described hereinbefore. D-rings 166 are fixed to the deck 156 and brackets 168 are bolted to the tower section 158. Cables or chains 170 are cross-tensioned to locate the tower section 158 against vertical lifting and longitudinal rolling. In this illustrative embodiment, the locating assembly 159 is comprised of the existing tower mount 164, the key assembly 160, and the foot-stop assembly 162. The mount is a typical flange and plate arrangement, known to those skilled in the art, that is bolted 172 to the end flange of the tower section 158. The key assembly 160 is welded to the deck 156. The key assembly 160 includes a portion of a position key means 178 that provides a positively located coupling between the key assembly 160 and the foot-stop assembly 162. The foot-stop assembly 162 is disengageably coupled to the key assembly 160 with a pair of steel pins 174 inserted through corresponding pin-holes in the two assembles. The tower mount 164 engages a recess formed in the top of the foot-stop assembly 162. The height of the foot-stop assembly 162 is selected and designed to locate the tower section 158 above the deck 156 of the railcar 154 at an elevation corresponding to the saddle assembly 175. The locating assembly 159 may be designed to either support or not support the weight of the tower section 158, as a design choice.

Figure 33:
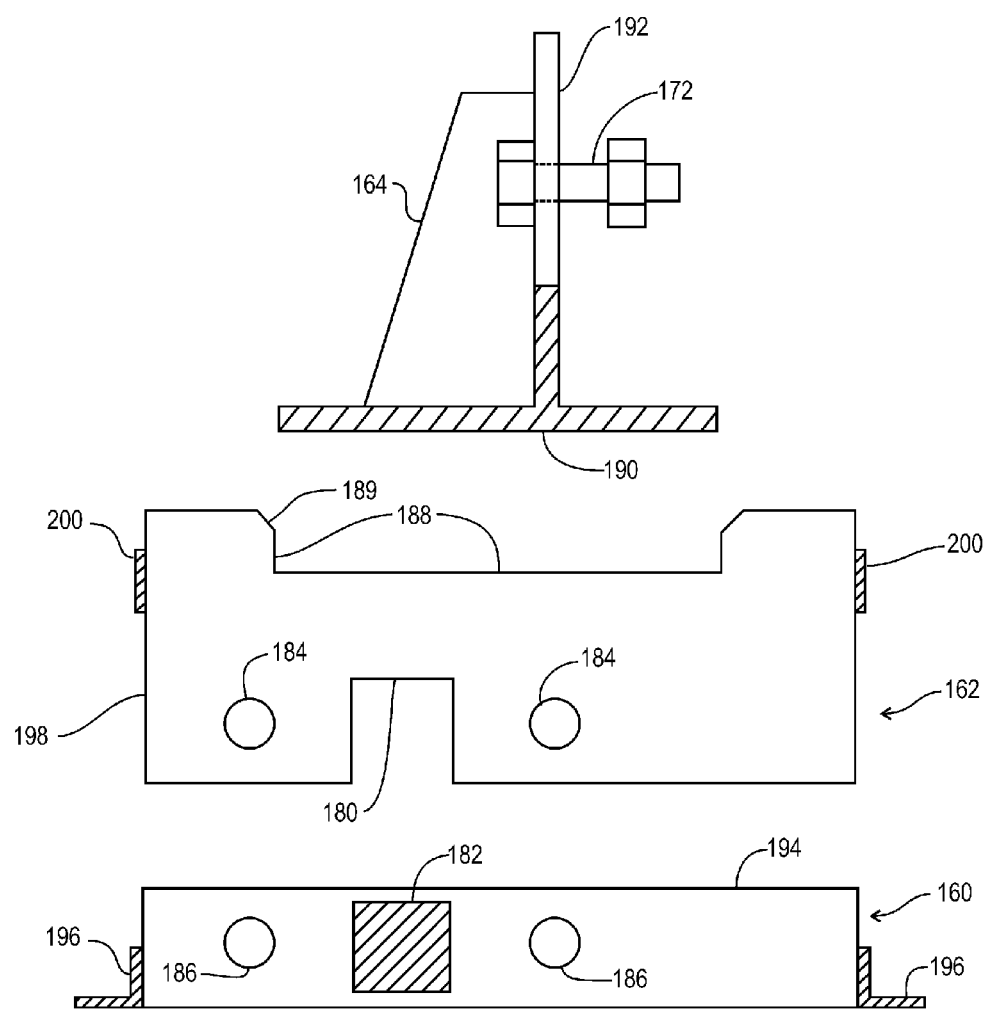
FIG. 33 is an expanded view drawing of a locating assembly, a foot-stop assembly, and tower mount according to an illustrative embodiment of the present invention.

Reference is directed to FIG. 33, which is an expanded view drawing of the locating assembly 159 according to an illustrative embodiment of the present invention. FIG. 33 corresponds to FIG. 31 and FIG. 32. In FIG. 33, the key assembly 160 is comprised of plural bar sections 194, steel bars for example, that are aligned in parallel and support one or more key bars 182 disposed between a pair of bars 194. The key bars 182 are welded in place in the illustrative embodiment. The plural bar sections 194 are held in alignment by a pair of angle irons 196, that also serve as a suitable portion of the key assembly 160 for fixed connection to the railcar deck (not shown), such as by welding, for example. The plural bar sections 194 are perforated with plural pin holes 186, which engage pins (not shown) to coupled the key assembly 160 with the foot-stop assembly 162.

FIG. 33 also illustrates the foot-stop assembly 162 portion of the locating assembly 159. The foot-stop assembly 162 is comprised of plural support plates 198 generally arranged in parallel and aligned to cooperatively engage between the plural bar sections 194 of the key assembly 160. The plural support plates 198 are maintained in alignment by a pair of alignment bars 200, which may be welded in place. Each of the plural support plates 198 has key slot 180 formed therein. The key slots 180 cooperatively engage the key bars 182 when the foot-stop assembly 162 is engaged with the key assembly 160. The plural support plates 198 each have a pair of pin holes 184 formed therein. The plural pin holes 184 are positioned to align with the plural pin holes 186 in the key assembly 160 while the two assemblies are engaged. Thusly, a pair of pins (not shown) can be inserted through the plural pin holes 186, 184 to form a solid connection therebetween. The top of each support plate 198 has a recess 188 formed therein for engaging the bottom plate 190 of the tower mount 164. The size of the recess 188 is selected to prevent significant longitudinal movement of the tower section (not shown) when the locating assembly 159 is placed into service. Note that the recess 188 include chamfered edges 189 to aid in assembling the locating assembly 159 in the field.

In the illustrative embodiment of FIG. 33, the tower section (not shown) is provided with a tower mount 164. The tower mount 164 may include a vertical flange 192 for accepting plural bolts 172 for connection to the tower section end flange (not shown). The tower mount 164 may also include a bottom plate 190 for engaging a support structure. In the illustrative embodiment, the bottom plate 190 cooperatively engages the foot-stop assembly 162.

Figure 34:
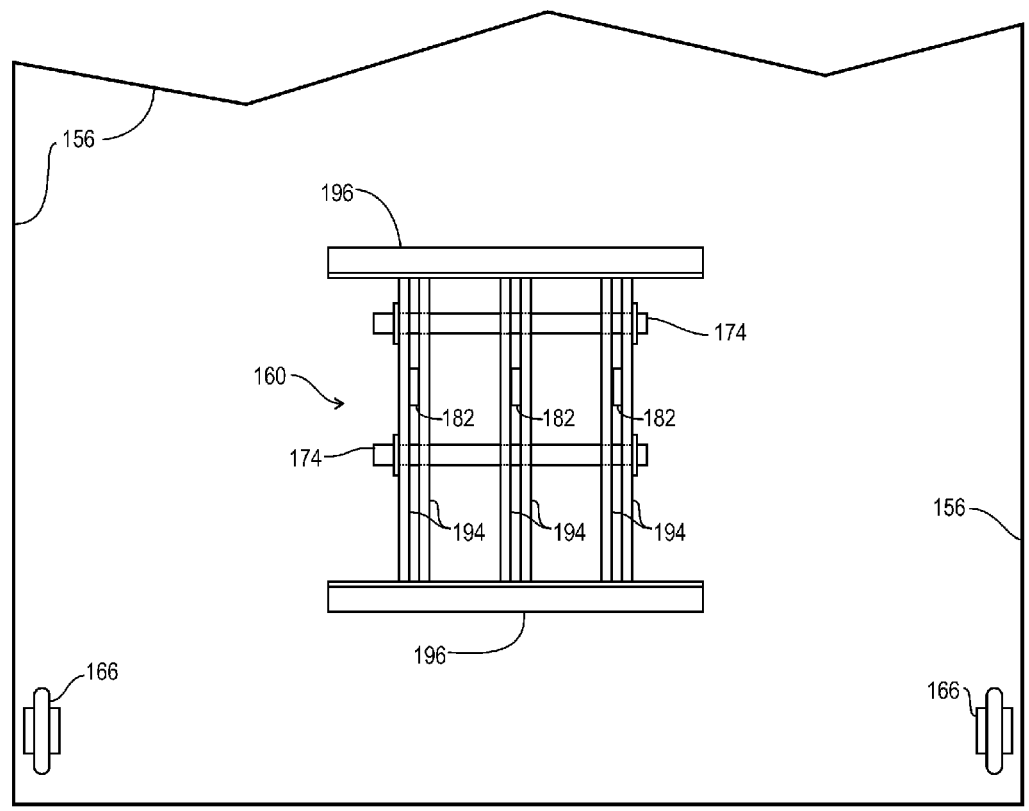
FIG. 34 is a top view drawing of a locating assembly fixed to a railcar according to an illustrative embodiment of the present invention.

Reference is directed to FIG. 34, which is a top view drawing of a key assembly fixed to a railcar according to an illustrative embodiment of the present invention. The railcar deck 156 is partially presented. The aforementioned D-rings 166 are positioned near the extreme corners of the deck 156. The key assembly 160 is welded to the deck 156 along the centerline of the railcar. The angle iron members 196 support the plural bar sections 194, which, in turn, locate the plural key bars 182. A pair of steel pins 174 are inserted through the plural pin holes.

Reference is directed to FIGS. 35A, 35B, and 35C, which are a top view, end view, and side view drawing, respectively, of a key assembly 160 according to an illustrative embodiment of the present invention. These figures provide a complete set of drawings of the key assembly according to this illustrative embodiment. The pair of angle irons 196 frame the key assembly 160. Six bar sections 194 are fixed between the angle irons 196, such as by welding them all together. Each of the bar sections 194 have two pin holes 186 formed therethrough and cooperatively aligned. Each adjacent pair of bar sections 194 support a corresponding key bar 182 therebetween. Each adjacent pair of bar sections 194 also serve to locate the correspond plate (not shown) from the foot-stop assembly (not shown) when they are engaged together. Those skilled in the art will appreciate that other structural arrangements could be utilized to provide the same interface or same functions of a key means and pin coupling.

Figure 36A:
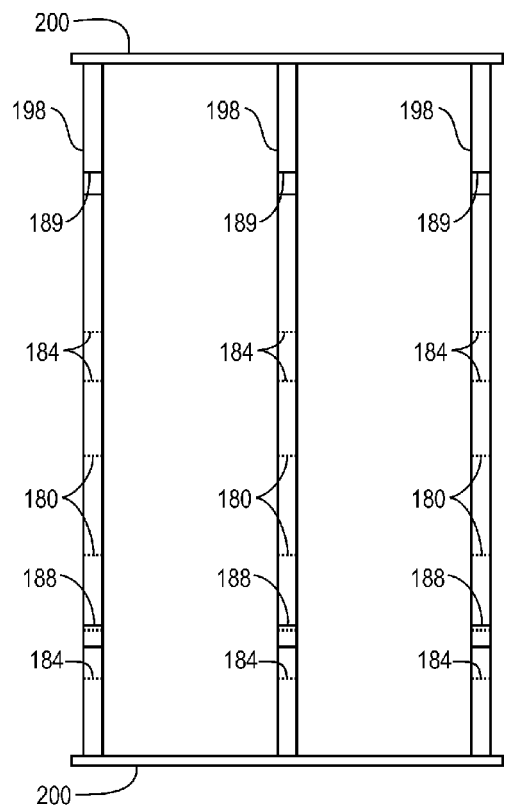
FIGS. 36A, 36B, and 36C are a top view, end view, and side view drawing, respectively, of a foot-stop assembly according to an illustrative embodiment of the present invention.
Figure 36C:
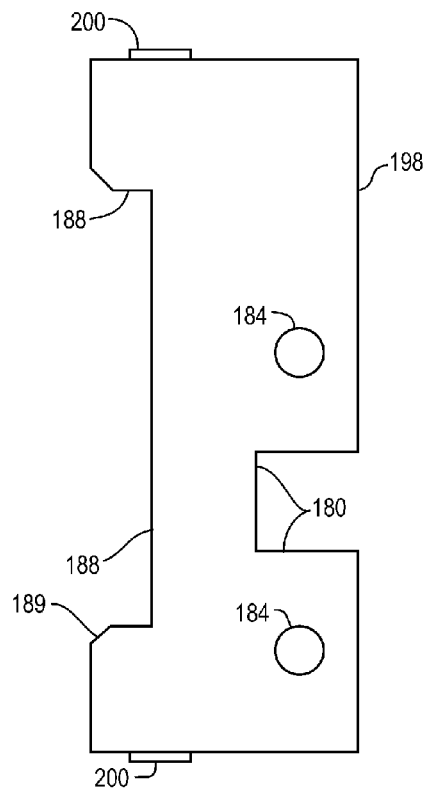
Figure 36B:
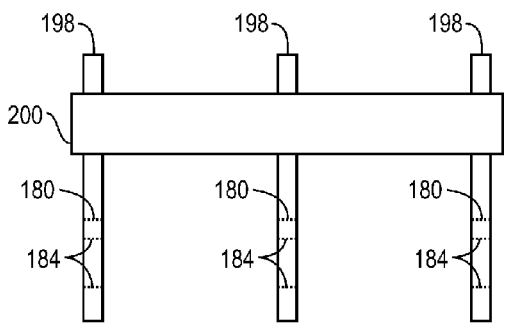

Reference is directed to FIGS. 36A, 36B, and 36C, which are a top view, end view, and side view drawing, respectively, of a foot-stop assembly 162 according to an illustrative embodiment of the present invention. The foot-stop assembly 162 is comprised of three support plates 198 that are arranged and located in relative position by a pair of alignment bars 200. Each support plate 198 includes a key slot 180 formed therein, and two pin holes 184 formed therethrough. When the foot-stop assembly 162 is engaged with key assembly, the key slot 180 cooperatively engages the key bar, discussed above. The pin holes 184 of the foot-stop assembly 162 also align with the pin holes on the key assembly, also discussed above. Each support plate 198 also fits between a pair of bar sections of the key assembly, again, discussed above. At the top of each support plate, a recess 188 is formed and includes chamfered cornets to facilitate alignment of the aforementioned tower mount into the recess 188.

Figure 37:
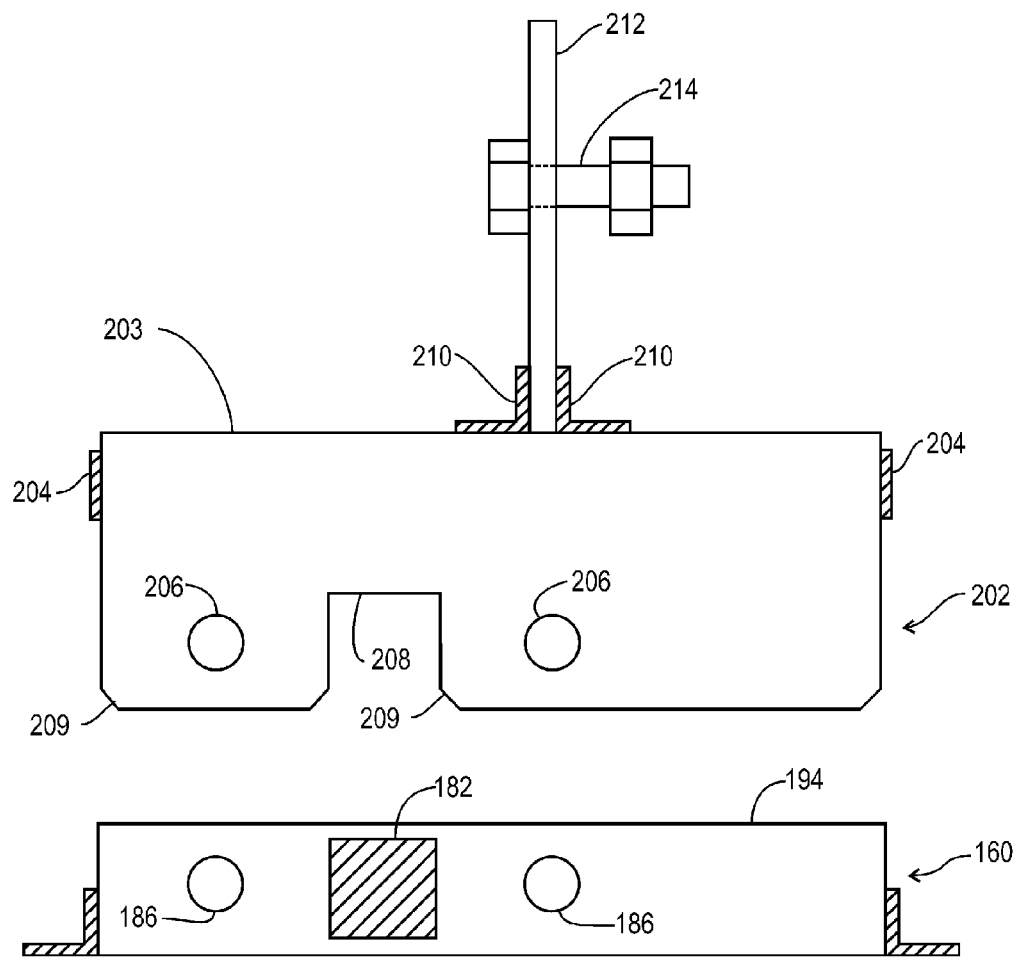
FIG. 37 is an expanded view drawing of a locating assembly and a foot-stop assembly according to an illustrative embodiment of the present invention.

Reference is directed to FIG. 37, which is an expanded view drawing of a locating assembly and a foot-stop assembly according to an illustrative embodiment of the present invention. This illustrative embodiment addresses the situation where the tower section is not provided with a tower mount. In this case, the foot-stop assembly 202 is provided with a mounting flange 212 for bolting 214 to the flange of the tower section (not shown). Further considering FIG. 37, which is an expanded view drawing of the locating assembly 201 according to an illustrative embodiment of the present invention. The key assembly 160 is comprised of plural bar sections 194, steel bars for example, that are aligned in parallel and support one or more key bars 182 disposed between a pair of bars 194. The key bars 182 are welded in place in the illustrative embodiment. The plural bar sections 194 are held in alignment by a pair of angle irons 196, that also serve as a suitable portion of the key assembly 160 for fixed connection to the railcar deck (not shown), such as by welding, for example. The plural bar sections 194 are perforated with plural pin holes 186, which engage pins (not shown) to coupled the key assembly 160 with the foot-stop assembly 162. The foot-stop assembly is structurally comparable to that discussed in FIGS. 33 and 36. The support plates 203 are aligned and connected with a pair of alignment bars 204. Each of the three support plates 203 includes a pair of pin holes 206, which cooperative aligned with the pin holes 186 in the key assembly 160. The support plates 203 each also include a key slot 208, also in cooperation with key bar 182. Note, however, that the key slot 208 and lower corners of the support plate 203 are chamfered 209 to facilitate alignment and coupling of the foot-stop assembly 202 with the key assembly 160. The mounting flange 212 is joint to the upper edge of the support plates 203 using a pair of angle irons 210. Other suitable structural arrangements will be appreciated by those skilled in the art.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting tower sections having various circumferences, including a first tower section having a smaller circumference than a second tower section having a larger circumference, wherein each tower section has a first end and an elongated portion, on a railcar having a deck for carrying a load, the system comprising:
a locating assembly, including a key assembly and a foot-stop assembly, said key assembly adapted to be rigidly fixed to the railcar deck and disengageably coupled to said foot-stop assembly, said foot-stop assembly adapted to be fixed to the first tower adjacent to the first end, said locating assembly configured to locate the first tower above the deck of the railcar;
a first saddle assembly having a base configured to rest upon the deck of the railcar at a second location along the elongated portion of the first tower section, and a saddle that conforms to the shape of the larger circumference of the second tower section, and
a spacer assembly, for disposition between said saddle of said first saddle assembly and the first tower section, and having a saddle rest that conforms to the shaped of said saddle, and a spacer saddle that conforms to the shape of the smaller circumference of the first tower section at said second location.

2. The system of claim 1, and wherein:
said locating assembly includes a position key means disposed between said foot-stop assembly and said key assembly, adapted to fixedly locate the first tower with respect to the deck of the railcar at least along the longitudinal axis of the railcar.

3. The system of claim 2, and wherein:
said position key means includes a key bar and a key slot.

4. The system of claim 2, and wherein:
said key position means is comprised of a key bar disposed on said key assembly and a key slot disposed on said foot-stop assembly.

5. The system of claim 1, and wherein:
said locating assembly includes plural pin holes dispose between said key assembly and said foot-stop assembly, and further comprising;
at least a first pin for insertion through at least a portion of said plural pins holes, thereby fixedly aligning and coupling said foot-stop assembly to said key assembly.

6. The system of claim 1, and wherein said key assembly is welded to the deck of the railcar and said foot-stop assembly is bolted to the first end of the first tower.

7. The system of claim 1, and wherein:
said foot-stop assembly is configured with a vertical height to accommodate a predetermined distance between the deck of the railcar and the first end of the first tower section.

8. The system of claim 1, and wherein:
said foot stop assembly is comprised of a foot portion rigidly connected to a mounting portion, wherein said foot portion is adapted to engage said key assembly and said mounting portion is adapted to engage the first end of the first tower.

9. The system of claim 8, and wherein said mounting portion is a flange having plural bolt holes.

10. The system of claim 1, wherein the first tower includes a mount attached to the first end, and wherein:
said foot assembly includes a mount engagement means configured to engage the mount to resist movement along the longitudinal axis of the railcar and resist rotation of the first tower about the first tower's longitudinal axis.

11. The system of claim 10 wherein the mount includes a horizontal support surface, and wherein:
said mount engagement means is a recess formed in the top of the foot-stop assembly shaped to partially conform to the shape of the horizontal support surface.

12. A method for transporting a tower, having a first end and an elongated portion, on a railcar having a deck for carrying a load, using a locating assembly including a key assembly and a foot-stop assembly, a saddle assembly having a base and a saddle that conforms to the shape of a large tower, and a spacer assembly having a saddle rest that conforms to the shaped of the saddle and a spacer saddle that conforms to the shape of the elongated portion of the tower, the method comprising the steps of:
rigidly fixing the key assembly to the railcar deck;
fixing the foot-stop assembly to the tower adjacent to the first end;
disengageably coupling the foot-stop assembly to the locating assembly, thereby locating the tower above the deck of the railcar;
resting the base of the saddle assembly upon the deck of the railcar;
engaging the saddle rest of the spacer assembly with the saddle of the saddle assembly, and
aligning the spacer saddle to conformally engage the elongated portion of the tower at a second location, and thereby supporting the tower above the railcar deck.

13. The method of claim 12, and wherein the locating assembly includes a position key means disposed between the foot-stop assembly and the key assembly, and further comprising the step of:
engaging the position key means thereby fixedly locating the tower with respect to the deck of the railcar at least along the longitudinal axis of the railcar.

14. The method of claim 13, and wherein:
said engaging the position keys means step is accomplished using a key bar and a key slot.

15. The method of claim 12, and wherein the locating assembly includes plural pin holes dispose between the key assembly and the foot-stop assembly, and further comprising the step of:
inserting at least a first pin through at least a portion of the plural pins holes, thereby fixedly aligning and coupling the foot-stop assembly to the key assembly.

16. The method of claim 12, further comprising the steps of:
welding the key assembly the deck of the railcar, and
bolting the foot-stop assembly to the first end of the tower.

17. The method of claim 12, further comprising the step of:
selecting a foot-stop assembly having a vertical height accommodating a predetermined distance between the deck of the railcar and the first end of the tower section.

18. The method of claim 12, wherein the tower includes a mount attached to the first end, and the foot assembly includes a mount engagement means, and further comprising the steps of:
engaging the mount with the mount engagement means, thereby resisting movement along the longitudinal axis of the railcar and resisting rotation of the tower about the tower's longitudinal axis.

* * * * *